US005159387A

United States Patent [19]

Takahashi et al.

[11] Patent Number: 5,159,387

[45] Date of Patent: Oct. 27, 1992

[54] IMAGE FORMING APPARATUS

[75] Inventors: Kenichi Takahashi; Yoichi Kawabuchi, both of Osaka, Japan

[73] Assignee: Minolta Camera Kabushiki Kaisha, Osaka, Japan

[21] Appl. No.: 772,139

[22] Filed: Oct. 9, 1991

Related U.S. Application Data

[63] Continuation of Ser. No. 489,518, Mar. 7, 1990.

[30] Foreign Application Priority Data

Mar. 8, 1989 [JP] Japan .................................... 1-55382

[51] Int. Cl.[5] ............................................. G03B 27/58

[52] U.S. Cl. ....................................... 355/72; 355/309; 355/311; 355/314

[58] Field of Search ................... 355/50, 72, 309, 311, 355/319; 271/9

[56] References Cited

U.S. PATENT DOCUMENTS 4,087,178 5/1978 Pfeifer et al. ........................ 355/72
4,204,668 5/1980 Yanagawa .............................. 271/9
4,279,504 7/1981 Brown et al. ......................... 355/72
4,337,935 7/1982 Sawada et al. ......................... 271/9
4,394,008 7/1983 Sugiyama ............................... 271/9
4,436,406 3/1984 Murasaki et al. .
4,449,705 5/1984 Shibuya et al. .
4,483,528 11/1984 Takeyama et al. ..................... 271/9
4,569,586 2/1986 Koyama ............................... 355/72
4,633,405 12/1986 Ito et al. ............................. 355/309
4,711,556 12/1987 Abuyama ........................... 355/309
4,896,871 1/1990 Idenawa ................................. 271/9

FOREIGN PATENT DOCUMENTS 54-48559 4/1979 Japan .

*Primary Examiner*—Monroe H. Hayes
*Attorney, Agent, or Firm*—Burns, Doane, Swecker & Mathis

[57] ABSTRACT

An image forming apparatus having a plurality of automatic sheet feeding portions and a manual sheet feeding portion in which recording papers are fed by the sheet supplying roller of one of the automatic sheet feeding portions wherein a warning of the presence of paper at the manual sheet feeding portion is controlled to inhibit copy operation for prevention of feeding the paper at the manual sheet feeding portion when a paper supply port is switched to the automatic sheet feeding portion whose feeding mechanism operates in conjunction with the manual sheet feeder portion and a paper sensor detects the paper at the manual sheet feeding portion.

16 Claims, 6 Drawing Sheets

IMAGE FORMING APPARATUS

This application is a continuation of application Ser. No. 07/489,518, filed Mar. 7, 1990.

BACKGROUND OF THE INVENTION

1. Field of the Invention

The present invention relates to an image forming apparatus with a manual sheet feeder portion.

2. Description of the Related Arts

Heretofore, various copy machines have been proposed wherein a manual sheet feeder portion is provided externally to multiple automatic sheet feeder portions provided with paper supplying rollers, and wherein the paper supplying roller of the aforesaid manual sheet feeder portion is used in conjunction with the paper supplying roller of one or another of the aforesaid automatic paper feeder portions.

In the aforesaid copy machine, an independent paper supplying roller of the manual sheet feeder portion is unnecessary, thereby allowing a reduction in the size of the sheet feeding device.

But paper is transported from the manual sheet feeder portion when paper has been introduced thereto and the automatic sheet feeder portion whose paper supplying roller is operating in conjunction with the manual feeding device is purposely or automatically selected as the paper supply port.

In a copy machine capable of switching to a specified priority paper supply port automatically without additional input after power has been applied or a set time after power has been applied, paper of a different size introduced to the manual sheet feeder portion may be supplied therefrom when the paper supplying roller of the aforesaid priority paper supply port operates in conjunction with the paper supplying roller of the manual sheet feeder portion.

The aforesaid problem is not limited only to copy machines, but is also common to image forming apparatus having a manual sheet feeder mechanism in addition to an automatic sheet feeder device.

SUMMARY OF THE INVENTION

A main object of the present invention is to provide an image forming apparatus having a manual sheet feeding means that operates in conjunction with any of a plurality of automatic sheet feeding means, wherein erroneous transport of manually fed paper is prevented when paper is present in the manual sheet feeder portion and the paper supply port is switched to the automatic sheet feeder portion that operates in conjunction with the aforesaid manual sheet feeder portion.

This and other objects of the present invention are accomplished by an image forming apparatus having a plurality of automatic sheet feeder portions and a manual sheet feeder portion wherein the paper supplying means of said manual sheet feeder portion operates in conjunction with the paper supplying means of one or another of the aforesaid automatic sheet feeder portions, said image forming apparatus providing a paper detecting means for detecting paper in the aforesaid manual sheet feeder portion, a warning means, and a control means for activating the aforesaid warning means to prevent the transport of manually fed paper if paper is present in the manual sheet feeder portion when the paper supply port is switched to the automatic sheet feeder portion that operates in conjunction with the aforesaid manual sheet feeder portion.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

FIG. *7a* and *7b* are a flow chart of the paper supply port selection routine.

DETAILED DESCRIPTION OF THE PREFERRED EMBODIMENTS

A preferred embodiment of the present invention is described hereinafter with reference to the accompanying drawings.

Figure 1:
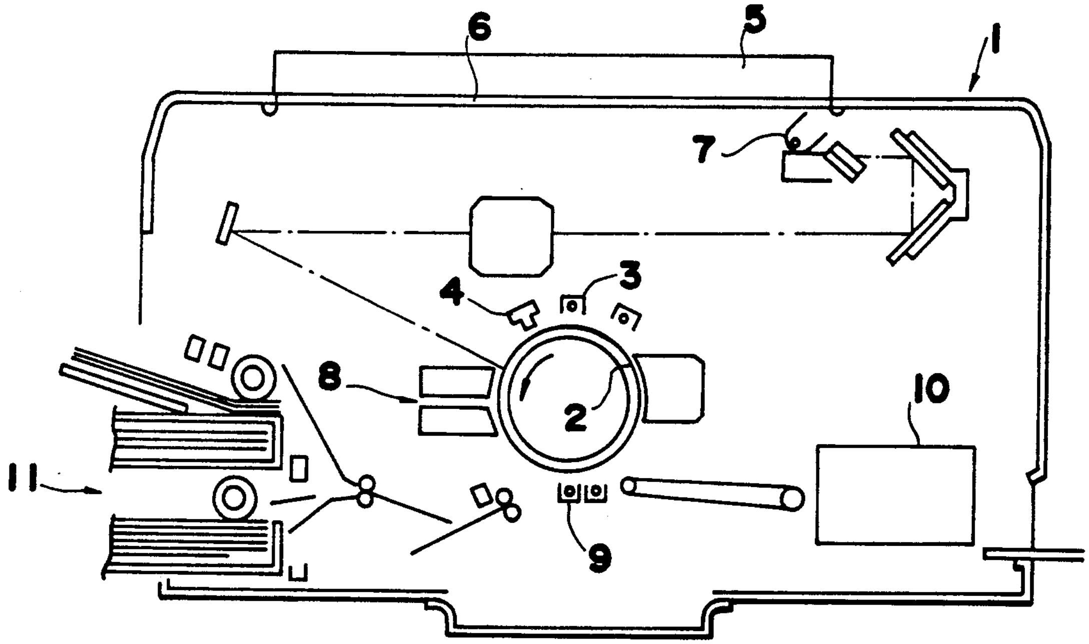
FIG. 1 is a section view of a copy machine.

FIG. 1 shows a cross section view of a copy machine.

In copy machine 1, a specified region on the exterior surface of photoconductive member 2, which is rotatable in the arrow direction, is charged by charger 3 and image interval erase (LED array) 4. On the other hand, exposure lamp 7 exposes an original document arranged on document glass platen 6 and covered by cover 5, and the light reflected from said original document is projected onto the charged region of the aforesaid photoconductive member 2, thereby forming an electrostatic latent image corresponding to the original document image on the surface of said photoconductive member 2.

The electrostatic latent image is developed as a toner image by developing device 8, and transferred to a sheet transported from a paper supplying apparatus 11 described later in the transfer region opposite transfer charger 9.

The sheet carrying the transferred toner image is transported to fixing device 10 where the toner image is thermally fused to said sheet, which is then discharged outside the machine.

Figure 2:
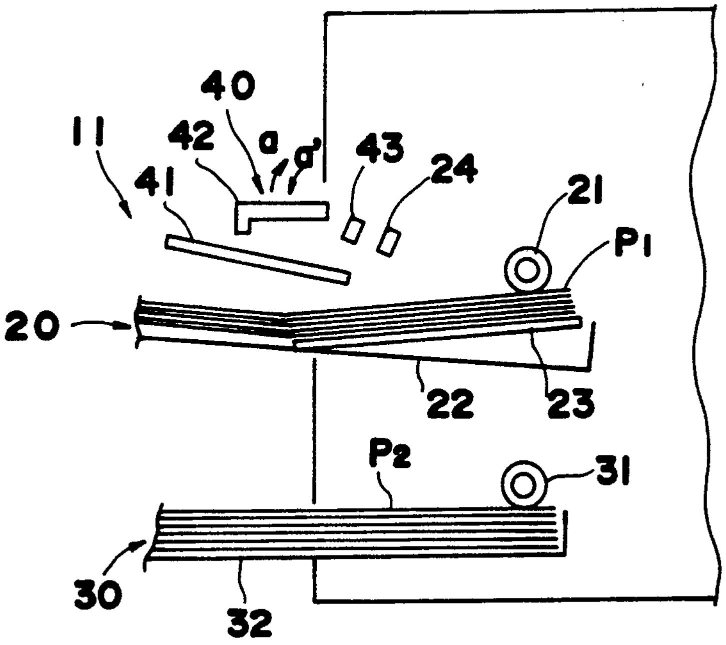
FIGS. 2 and 3 are section views of the paper supplying apparatus.
Figure 3:
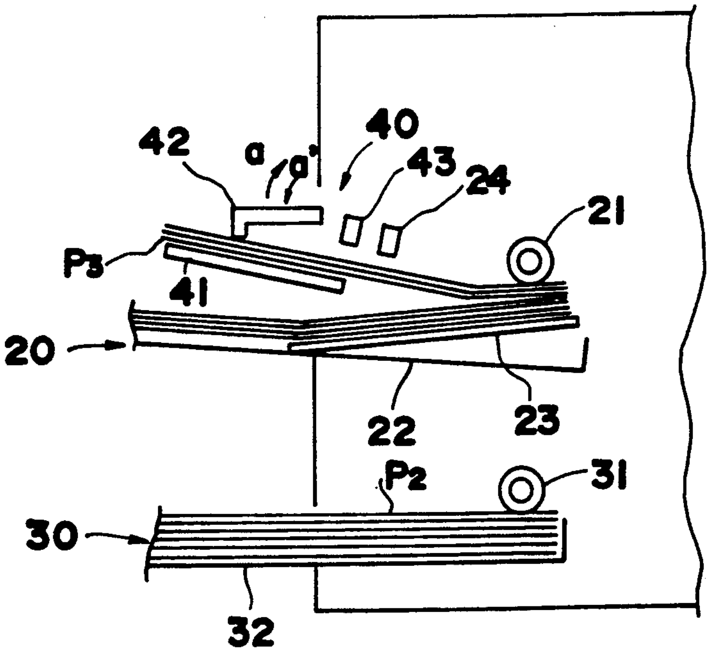

FIGS. 2 and 3 show cross section views of paper supplying apparatus 11 which comprises a top automatic sheet feeder portion 20, a bottom automatic sheet feeder portion 30, and a manual sheet feeder portion 40.

Top automatic sheet feeder portion 20 is provided a paper supplying roller 21 and a removable paper cassette 22. The front portion of bottom plate 23 in paper cassette 22 is vertically movable, and is raised by a motor not shown in the drawings when said paper cassette 22 is installed in the sheet feeder portion, so that paper $P_1$ accommodated in paper cassette 22 makes pressure contact with the aforesaid paper supplying roller 21.

Bottom automatic sheet feeder portion 30 is provided a paper supplying roller 31 which makes pressure contact with the top frontal surface of paper $P_2$ accommodated in paper cassette 32 when said cassette 32 is installed.

Manual sheet feeder portion 40 is disposed above the previously described top automatic sheet feeder portion 20. Manual tray 41 is fixed above paper cassette 22. Manual tray cover 42 is provided above the manual tray so as to be capable of opening and closing. Bottom plate 23 of paper cassette 22 is lowered when the manual tray cover 42 is opened in the direction of arrow [a]. A paper detecting sensor 43 is disposed above manual tray 41 to detect the presence of manually fed paper sheet $P_3$. A sensor 24 is disposed laterally to the aforesaid paper detecting sensor 43 to detect the presence of paper $P_1$ fed from automatic sheet feeder portion 20.

In paper supplying apparatus 11 of the aforesaid construction, paper $P_1$ and $P_2$ are accommodated in paper cassettes 22 and 32 of top and bottom automatic sheet feeder portions 20 and 30 respectively, and the uppermost sheets are transported into copy machine 1 by the rotation of paper supplying rollers 21 and 31 respectively.

When paper $P_3$ is transported from manual sheet feeder portion 40, bottom plate 23 of top paper cassette 22 is lowered by opening manual tray cover 42, thereby separating paper $P_1$ in paper cassette 22 from paper supplying roller 21. When paper $P_3$ is inserted from manual tray 41, said sheet $P_3$ is detected by sensor 43. Then, bottom plate 23 is raised when manual tray cover 42 is closed in the direction of arrow [a']so that the top frontal surface of manually fed paper $P_3$ makes pressure contact with paper supplying roller 21, and then said manually fed paper $P_3$ is transported into copy machine 1 based on the rotation of said paper supplying roller 21.

Figure 4:
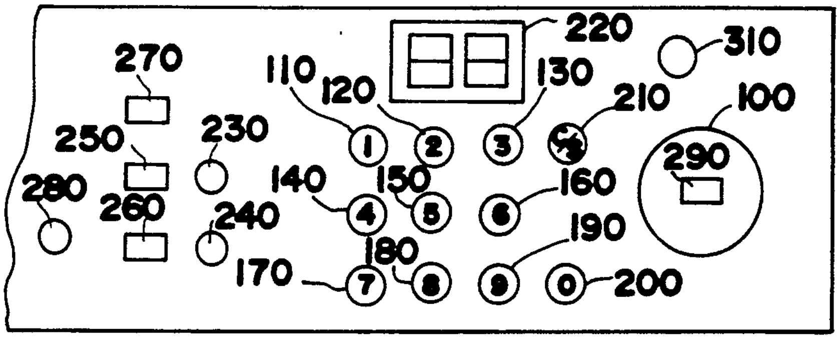
FIG. 4 is a plan view of the operation panel.

FIG. 4 is a plan view of the operation panel of copy machine 1.

Item 100 in the drawing is a PRINT key for starting the copy operation; items 110 to 200 comprise a ten-key pad of numeric keys [0]to [9]; item 210 is a CLEAR/-STOP key for use to clear the copy number (set sheet number) and stop the copy operation; item 220 is a display portion that displays the set copy number; items 230 and 240 paper supply selection switches for selecting top sheet feeder portion 20 and bottom sheet feeder portion 30 respectively; items 250 and 260 paper supply port indicator lamps that indicate selection of top sheet feeder portion 20 and bottom sheet feeder portion 30 respectively; item 270 is a warning lamp to indicate that a manually fed sheet $P_3$ is inserted in manual paper supplying portion 40. item 280 is a priority paper supply port setting key. If either switch 230 or 240 is depressed after priority paper supply port setting key 280 is depressed, a sheet feeder portion corresponding to the pressed switch is selected as the priority paper supply port. Item 290 is an indicator lamp to indicate that the copy operation is in the ready (enabled) state; item 310 is an ALL RESET key to return the copy machine set in the special mode to standard mode status.

Figure 5:
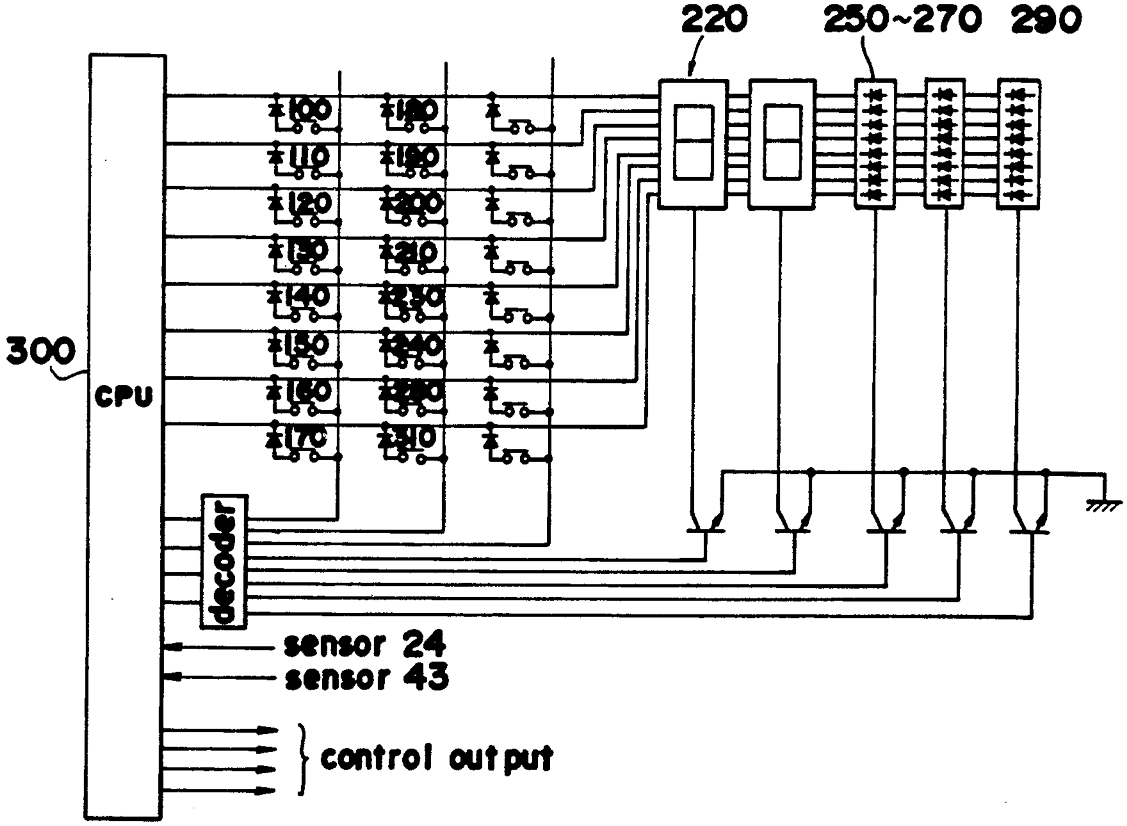
FIG. 5 is a diagram of the control circuit.

Each of the aforesaid keys and sensors 24 and 43 in paper supplying apparatus 11 comprise the control circuit centered around microcomputer 300 (hereinafter referred to as "CPU"), as shown in FIG. 5.

The substance of control by the control circuit shown in FIG. 5 is described hereinafter with reference to FIGS. 6 and 7.

The terms "ON EDGE" and "OFF EDGE" are defined hereinafter, before explaining the flow charts.

ON EDGE is defined as the state of change wherein the state of a switch, sensor or signal changes from OFF to ON.

OFF EDGE is defined as the state of change wherein the state of a switch, sensor or signal changes from ON to OFF.

Figure 6:
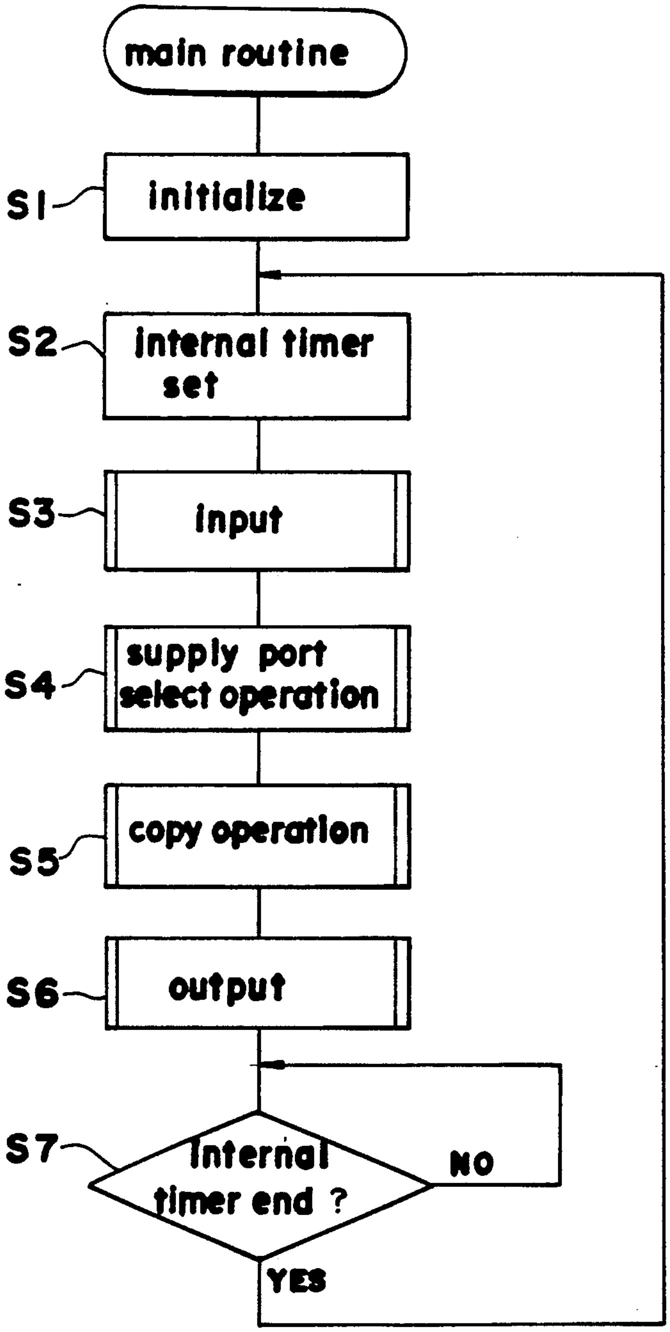
FIG. 6 is a flow chart of the main routine.
Figure 7A:
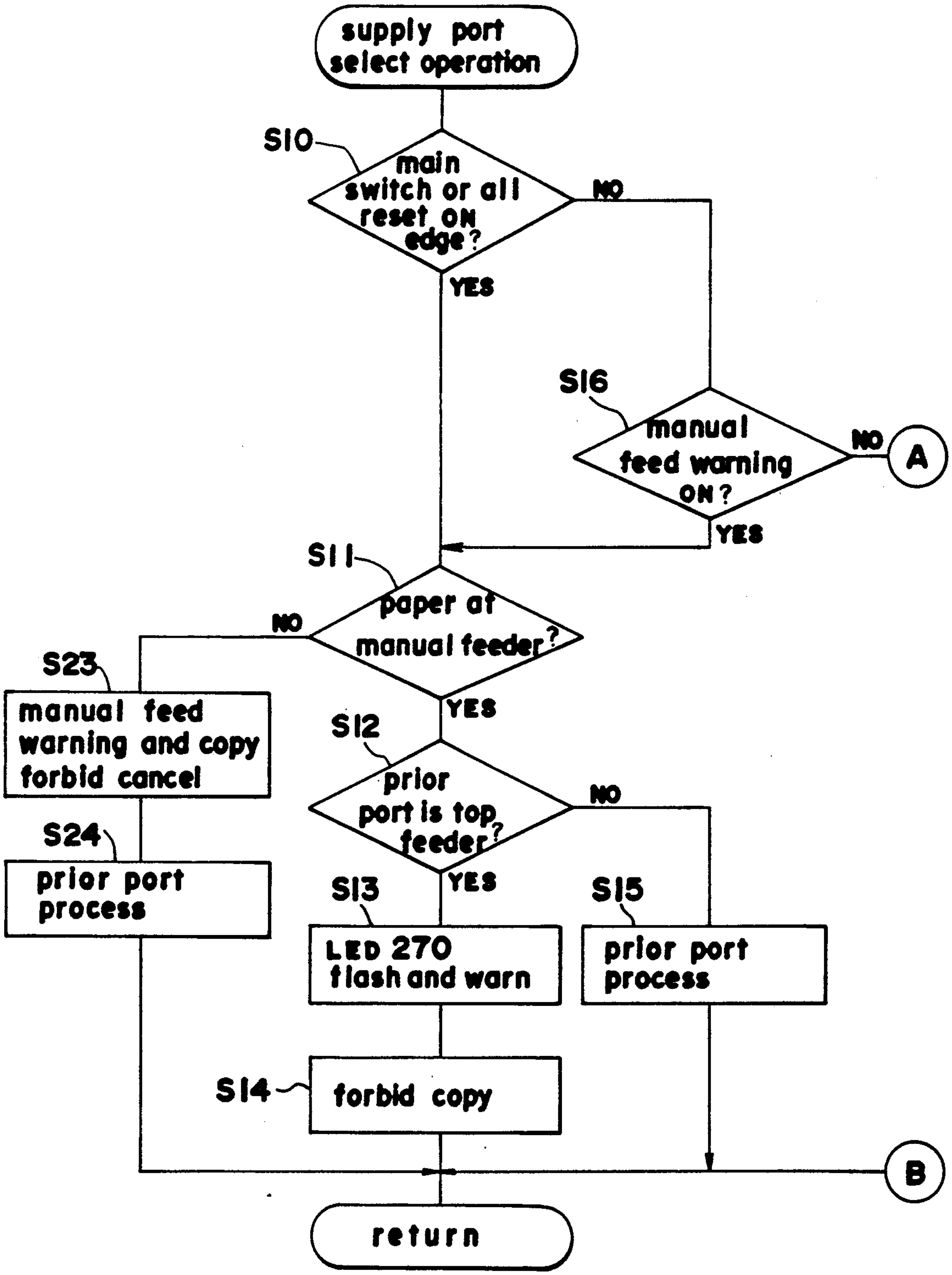
Figure 7B:
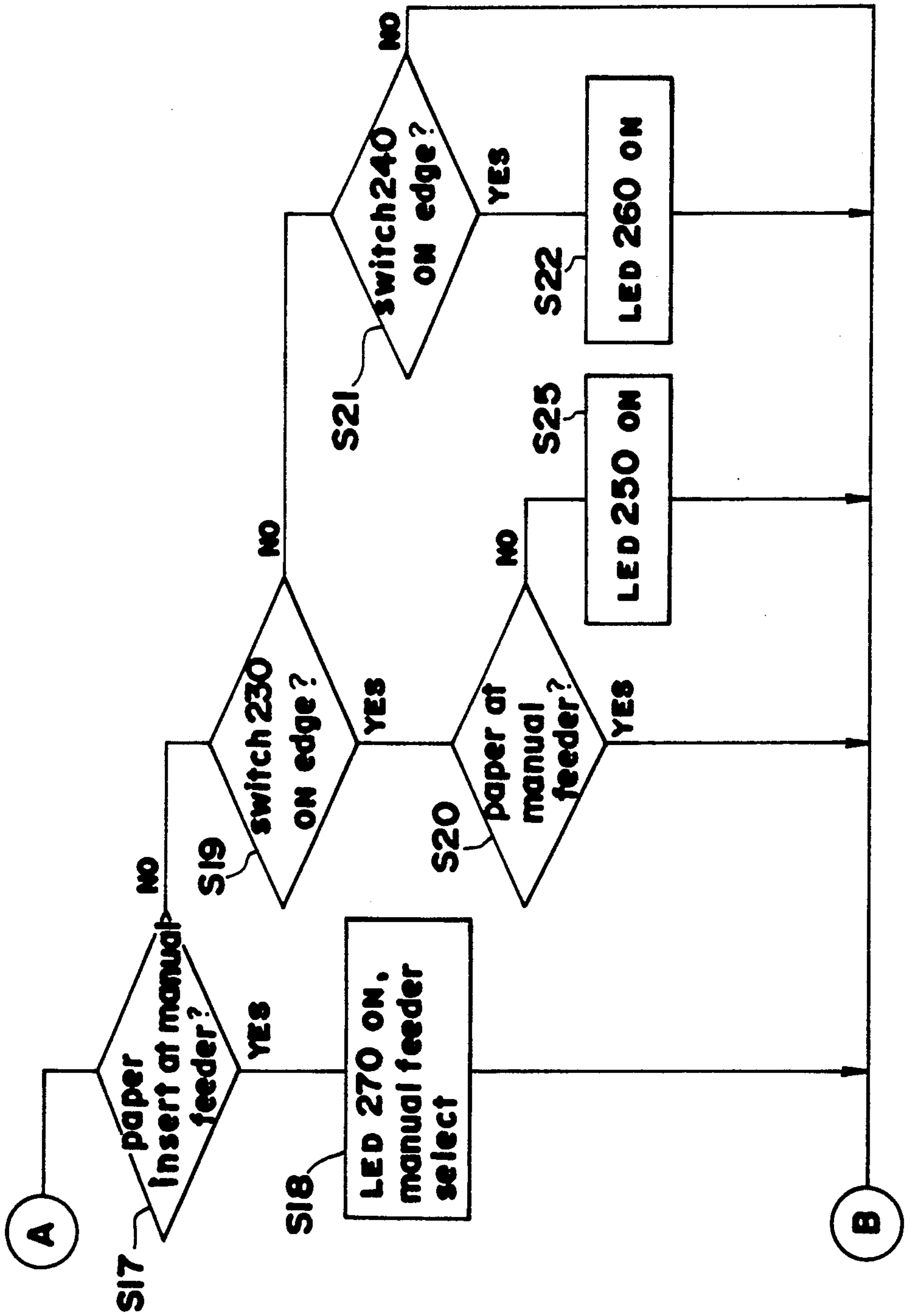

Main Routine (refer to FIG. 6)

When the power unit of copy machine 1 is switched ON, the random access memory (RAM) in CPU 300 is cleared and the standard copy mode is initialized in step S1. At this time, top automatic sheet feeder portion 20 in paper supplying apparatus 11 is automatically selected.

In step S2, the internal timer is set in CPU 300. This timer manages the time for 1-routine required in control described below.

In step S3, the input from the operation panel and each sensor is received and processed.

In step S4, the paper supply port selection operation is executed. The main routine of the operation is described later.

In step S5, sequential operations of the aforesaid copy machine are executed from copy start to end.

In step S6, control signals and display signals are processed, and necessary information is displayed on the operation panel.

In step S7, completion of the internal timer set in step S2 is determined. When the timer ends, the routine returns to step S2, and thereafter the execution of steps S2 through S7 is repeated.

2. Paper Supply Port Selection Process (refer to FIG. 7)

The contents of the paper supply port selection routine of step S4 are hereinafter described.

In step S10, the ON EDGE status of the main switch and ON EDGE status of ALL RESET key 310 are detected.

When the ON EDGE states of the aforesaid switches are detected, then a check is made in step S11 to determine whether or not paper $P_3$ is present in manual sheet feeder portion 40. The aforesaid determination is made based on the output from sensor 43.

When paper $P_3$ has been inserted in manual sheet feeder portion 40, a check is made in step S12 to determine whether or not top sheet feeder portion 20 has been selected as the priority paper supply port.

When top sheet feeder portion 20 is selected as the priority paper supply port, paper transport is executed without modification so that manually fed paper $P_3$ inserted in manual sheet feeder portion 40 is transported into copy machine 1. Accordingly, LED 270 flashes in step S13 to warn that manually fed paper $P_3$ has been inserted in the priority paper supply port (top sheet feeder portion), and in step S14 the copy operation is forbidden.

Conversely, when the bottom sheet feeder portion 30 is selected as the priority paper supply port, manually fed paper $P_3$ is not transported even if the copy operation is executed without further modification. Therefore, when bottom sheet feeder portion 30 is selected as the priority paper supply port, in step S15 LED 260 is lighted and the state is set for paper transport from said bottom sheet feeder portion 30.

When the result of the determination in step S11 is that manually fed paper $P_3$ is not present in manual sheet feeder portion 40, and the current LED 270 flashes a warning , said warning operation and prohibition of the copy operation are canceled in step S23, and in step S24 paper transport from the priority paper supply port selected by selection key 280 is set to the ready (enabled) state.

On the other hand, when the main switch and ALL RESET switch ON EDGE state is not detected, i.e., in the normal state after the copy machine power unit is switched ON, a check is made in step S16 to determine whether or not LED 270 is flashing.

When LED 270 is flashing, a check is made to determine whether or not manually fed paper $P_3$ is inserted in manual sheet feeder portion 40 in step S11, and the routine advances to step S12 or step S23 based on the result of the determination in said step S11 so as to execute the previously described operations.

When LED 270 is not flashing, sensor 43 0N EDGE state is detected in step S17 when manually fed paper $P_3$ is inserted in manual sheet feeder portion 40, LED 270 is lighted in step S18, and the manual sheet feed state is set.

On the other hand, when manually fed paper $P_3$ is not inserted in manual sheet feeder portion 40, the ON EDGE state of top sheet feeder portion selection switch 230 is detected in step S19, and when said switch 230 is depressed a check is made in step S20 to determine whether or not manually fed paper $P_3$ has been inserted in manual sheet feeder portion 40. If paper $P_3$ has been inserted in manual sheet feeder portion 40, the routine returns to the main routine. However, if paper $P_3$ is not present, LED 250 is lighted in step S25.

If the ON EDGE state of top sheet feeder portion selection switch 230 is not detected, the 0N EDGE state of bottom sheet feeder portion selection switch 240 is detected in step S21, and when said switch 240 is depressed, LED 260 is lighted in step S22. Conversely, if the ON EDGE state of switch 240 is not detected in step S21, the routine returns to the main routine without further operation.

Although the ON EDGE state of only the copy machine main switch and ALL RESET switch are detected in step S10 in the previously described embodiment, an AUTO CLEAR return signal may also be detected in step S10 in the case of a copy machine having an AUTO CLEAR function, i.e., a copy machine having a function whereby the machine is returned to the standard mode state after a specified time elapses following completion of the copy operation.

Further, although a copy machine is used in the previously described embodiment as shown in FIG. 1, the present invention is not limited to application in copy machines, but rather is also adaptable to any image forming apparatus having a manual sheet feeder mechanism in addition to an automatic sheet feeder device.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:

a plurality of automatic sheet feeding portions each having sheet supplying means for supplying recording papers;

a manual sheet feeding portion for feeding recording papers wherein said papers are fed by one of said sheet supplying means;

means for providing a warning as to the presence of paper in said manual sheet feeding portion; and means for controlling said warning means so as to provide the warning when the automatic sheet feeding portion which includes said one of the sheet supplying means is selected to feed the paper at a time when paper, which had previously been inserted in said manual paper feeding portion, remains present in the manual sheet feeding portion.

2. The image forming apparatus as claimed in claim 1 further comprising means for detecting the paper at said manual sheet feeding portion.

3. An image forming apparatus comprising:

a main body comprising an image forming means for forming images on a photosensitive member, a developing means for developing the formed images, a transfer means for transferring the images developed by said developing means to recording papers;

a plurality of automatic sheet feeding portions each having sheet supplying means for supplying recording papers to said transfer means;

a manual sheet feeding portion provided above one of said automatic feeding portions wherein said papers are fed by one sheet supplying means of one of said automatic sheet feeding portions;

means for detecting paper at said manual sheet feeding portion;

means for providing a warning as to the presence of paper in said manual sheet feeding portion; and means for controlling said warning means to provide the warning when the automatic sheet feeding portion which includes said one of said sheet supplying means is selected to feed the paper at a time when paper, which had previously been inserted in said manual paper feeding portion, remains present in the manual sheet feeding portion.

4. The image forming apparatus as claimed in claim 3, wherein one of said automatic sheet feeding portions further comprises a cassette accommodating papers therein with a movable plate supporting the papers, and wherein said manual sheet feeding portion further comprises a manual sheet feeding member movable between a first position and a second position whereby when said member is moved to said second position from said first position, said movable plate moves in conjunction with said member to allow the papers in said manual sheet feeding portion to be fed by said one of said sheet supplying means.

5. An image forming apparatus comprising:

a first automatic paper feeding portion comprising a first feeding roller for feeding recording papers one by one;

a second automatic paper feeding portion comprising a second feeding roller for feeding recording papers one by one;

a manual paper feeding portion for feeding recording papers manually wherein the recording papers are fed by said first feeding roller;

means for detecting the presence of paper in said manual paper feeding portion;

means for selecting any of the automatic feeding portions from which paper is to be fed;

warning means for providing a warning as to the presence of paper in said manual paper feeding portion; and control means for activating said warning means when said first automatic paper feeding portion is selected by said selecting means, provided that paper, which had previously been inserted in said manual paper feeding portion, remains present in the manual paper feeding portion at the time that said first automatic paper feeding portion is selected.

6. The image forming apparatus as claimed in claim 5, wherein said first automatic paper feeding portion further comprises a cassette accommodating the recording papers therein with a movable plate supporting the papers, and wherein said manual paper feeding portion further comprises a manual paper feeding member movable between a first position and a second position whereby when said member is moved to said second position from said first position, said movable plate moves in conjunction with said member to allow the papers in said manual paper feeding member to be fed by said first feeding roller.

7. The image forming apparatus as claimed in claim 5, wherein said selection means selects either said first or second automatic paper feeding portion at a prescribed time after making a copy.

8. The image forming apparatus of claim 5, further comprising means for designating one of said automatic paper feeding portions as a priority feeding portion.

9. The image forming apparatus of claim 8, wherein said selecting means selects said priority feeding portion when said image forming apparatus is turned on.

10. The image forming apparatus of claim 8, further comprising reset means for resetting the image forming apparatus to a standard mode.

11. The image forming apparatus of claim 10, wherein said selecting means selects said priority feeding portion when said reset means is activated.

12. An image forming apparatus comprising:

a plurality of automatic paper feeding portions, each of which comprises a feeding roller for feeding recording papers one by one;

a manual paper feeding portion for feeding recording papers manually wherein the recording papers are fed by said feeding roller of a first of said plurality of automatic paper feeding portions;

means for detecting the presence of paper in said manual paper feeding portion;

means for selecting one of the automatic paper feeding portions; and means for prohibiting feeding when said selection means is operated to select the first automatic paper feeding portion at a time when paper, which had previously been inserted in said manual paper feeding portion, remains in said manual paper feeding portion.

13. An image forming apparatus comprising:

a first automatic paper feeding portion comprising a first feeding roller for feeding recording papers one by one;

a second automatic paper feeding portion comprising a second feeding roller for feeding recording papers one by one;

a manual paper feeding portion for feeding recording papers manually wherein the recording papers are fed by said first feeding roller;

reset means for resetting the image forming apparatus to a standard mode;

means for detecting the presence of paper in said manual paper feeding portion;

means for designating one of the automatic feeding portions to be a priority paper feeding portion;

means for warning an operator of the image forming apparatus of the presence of paper in said manual paper feeding portion; and means for activating the warning means when the reset means is activated, provided that the first automatic paper feeding portion is designated as the priority paper feeding portion and paper, which had previously been inserted in said manual paper feeding portion, remains present in said manual paper feeding portion at the time the reset means is activated.

14. The image forming apparatus of claim 13, further comprising a power switch for turning the image forming apparatus on and off.

15. The image forming apparatus of claim 14, wherein the reset means is activated by the power switch.

16. The image forming apparatus of claim 15, further comprising a reset switch for activating the reset means.

* * * * *